US005935221A

United States Patent [19]

Felmus et al.

[11] Patent Number: 5,935,221

[45] Date of Patent: Aug. 10, 1999

[54] MAILING MACHINE DISABLING A KEYBOARD/DISPLAY OF A RESIDENT USER INTERFACE WHICH HAS FUNCTION KEYS AND THE KEYBOARD/DISPLAY IF AN EXTERNAL USER INTERFACE IS CONNECTED

[75] Inventors: Benita F. Felmus, Westport; Christopher S. Riello, Hamden; Edilberto I. Salazar, Brookfield; Richard P. Schoonmaker, Wilton, all of Conn.

[73] Assignee: Pitney Bowes Inc., Stamford, Conn.

[21] Appl. No.: 08/886,099

[22] Filed: Jun. 30, 1997

[51] Int. Cl.[6] .............................. G06F 13/10; G06F 13/14

[52] U.S. Cl. .................................. 710/10; 710/38; 710/51

[58] Field of Search .................................... 395/821, 830; 370/532; 345/326; 710/10, 38, 51

[56] References Cited

U.S. PATENT DOCUMENTS

| | | | |
|---|---|---|---|
| 5,264,958 | 11/1993 | Johnson | 395/325 |
| 5,680,403 | 10/1997 | Riello et al. | 370/532 |
| 5,711,013 | 1/1998 | Collett et al. | 455/558 |
| 5,825,505 | 10/1998 | Toyoda et al. | 358/400 |

*Primary Examiner*—Thomas C. Lee
*Assistant Examiner*—Ilwoo Park
*Attorney, Agent, or Firm*—Angelo N. Chaclas; Melvin J. Scolnick

[57] ABSTRACT

A mailing machine includes an external communication port, a resident user interface and a control system in operative communication with the resident user interface and the external communication port. The control system detects whether or not an external user interface is connected at the external communication port and, if the external user interface is connected, enables the external user interface and disables a portion of the resident user interface. The external user interface provides additional functionality beyond the resident user interface. A corresponding method of operating the mailing machine is also provided.

20 Claims, 4 Drawing Sheets

MAILING MACHINE DISABLING A KEYBOARD/DISPLAY OF A RESIDENT USER INTERFACE WHICH HAS FUNCTION KEYS AND THE KEYBOARD/DISPLAY IF AN EXTERNAL USER INTERFACE IS CONNECTED

CROSS REFERENCE TO RELATED APPLICATIONS

This application is related to copending U.S. patent application Ser. No. 08/572,321 (now U.S. Pat. No. 5,680,403); filed on Dec. 14,1995, and entitled MULTIPLEX SERIAL DATA COMMUNICATIONS WITH A SINGLE UART FOR A POSTAGE METER MAILING MACHINE SYSTEM.

FIELD OF THE INVENTION

The present invention relates generally to a mailing machine. More particularly, the invention relates to a mailing machine having a base and a virtual user interface allowing the base to be interchangeably connected with a plurality of different user interface devices.

BACKGROUND OF THE INVENTION

Mailing machines are well known in the art. Generally, mailing machines are readily available from manufactures such as Pitney Bowes, Inc. of Stamford, Conn. Mailing machines often include a variety of different modules which automate the processes of producing mailpieces. The typical mailing machine includes a variety of different modules or sub-systems where each module performs a different task on a mailpiece, such as: singulating (separating the mailpieces one at a time from a stack of mailpieces), weighing, sealing (wetting and closing the glued flap of an envelope), applying evidence of postage, accounting for postage used, feeding roll tape or cut tape strips for printing and stacking finished mailpieces. Customarily, the mailing machine also includes a transport apparatus which feeds the mailpieces in a path of travel through the successive modules of the mailing machine. Additionally, the mailing machine may include various software modules for performing accounting operations, generating transaction and summary reports, and performing manifest mailing system operations.

To meet the needs of each particular user, it is common for mailing machines to be designed with the wide variety of functionality and features described above. In this manner, the mailing machine is fully configured to perform all the functions that may be requested by any user. However, only those functions and features that have been purchased by the user will be "turned on" or "enabled" in the mailing machine by the manufacturer. Thus, full functionality is resident in the mailing machine but not necessarily available depending upon what was purchased by the user.

Although this approach generally works well, it is not tailored to the needs of each particular user and has the tendency to increase costs. For example, an experienced user may not require a sophisticated or "high end" user interface with an elaborate display that provides pictorial prompts and clues as to how to operate the mailing machine. A "low end" user interface providing a simple LED display and keyboard may be all that the experienced user requires. On the other hand, an inexperienced user may want a sophisticated user interface to aid in training and operation of the mailing machine. To serve both the experience and the inexperienced users, it is typical for manufacturers to supply a single user interface which tends toward the high end. This increases the costs of the mailing machine which are then passed along to both users even though the experienced user does not benefit from the additional capabilities. Thus, the experienced user is forced to pay for something that he does not require.

As another example, a user operating a custom or direct production mail service operating a high volume mailing facility as a service to others will have different needs than a user operating a dedicated mail room. The custom user will require a sophisticated accounting system with a plurality of different accounts for tracking postal fees so that costs can be charged back. Also, the custom user may require the ability to compare rates between the postal service and other carriers and then select a carrier accordingly. Furthermore, the custom user will have the need to generate sophisticated reports to track mailing machine activities for scheduling purposes and to optimize mailing machine usage. On the other hand, the dedicated user will likely require a less sophisticated accounting system and less robust features. However, it is typical for the basic electronics and software included in the mailing machine to be configured to support all the functionality that may be required by any user. This drives up the cost of the basic mailing machine for even those users that do not require such features.

Therefore, there is a need for a mailing machine which provides for a variety of user interfaces and functionality adapted to the needs of each particular user which tends to decrease the cost of the basic mailing machine itself.

SUMMARY OF THE INVENTION

It is an object of the present invention to provide a mailing machine that substantially overcomes the disadvantages and problems associated with the prior art mailing machines.

In accomplishing this and other objects there is provided a mailing machine including an external communication port, a resident user interface and a control system in operative communication with the resident user interface and the external communication port. The control system detects whether or not an external user interface is connected at the external communication port and, if the external user interface is connected, enables the external user interface and disables a portion of the resident user interface. The external user interface provides additional functionality beyond the resident user interface.

In accomplishing this and other objects there is also provided a corresponding method of operating the mailing machine of the present invention.

Additional objects and advantages of the invention will be set forth in the description which follows, and in part will be obvious to those skilled in the art from the description, or may be learned by practice of the invention.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
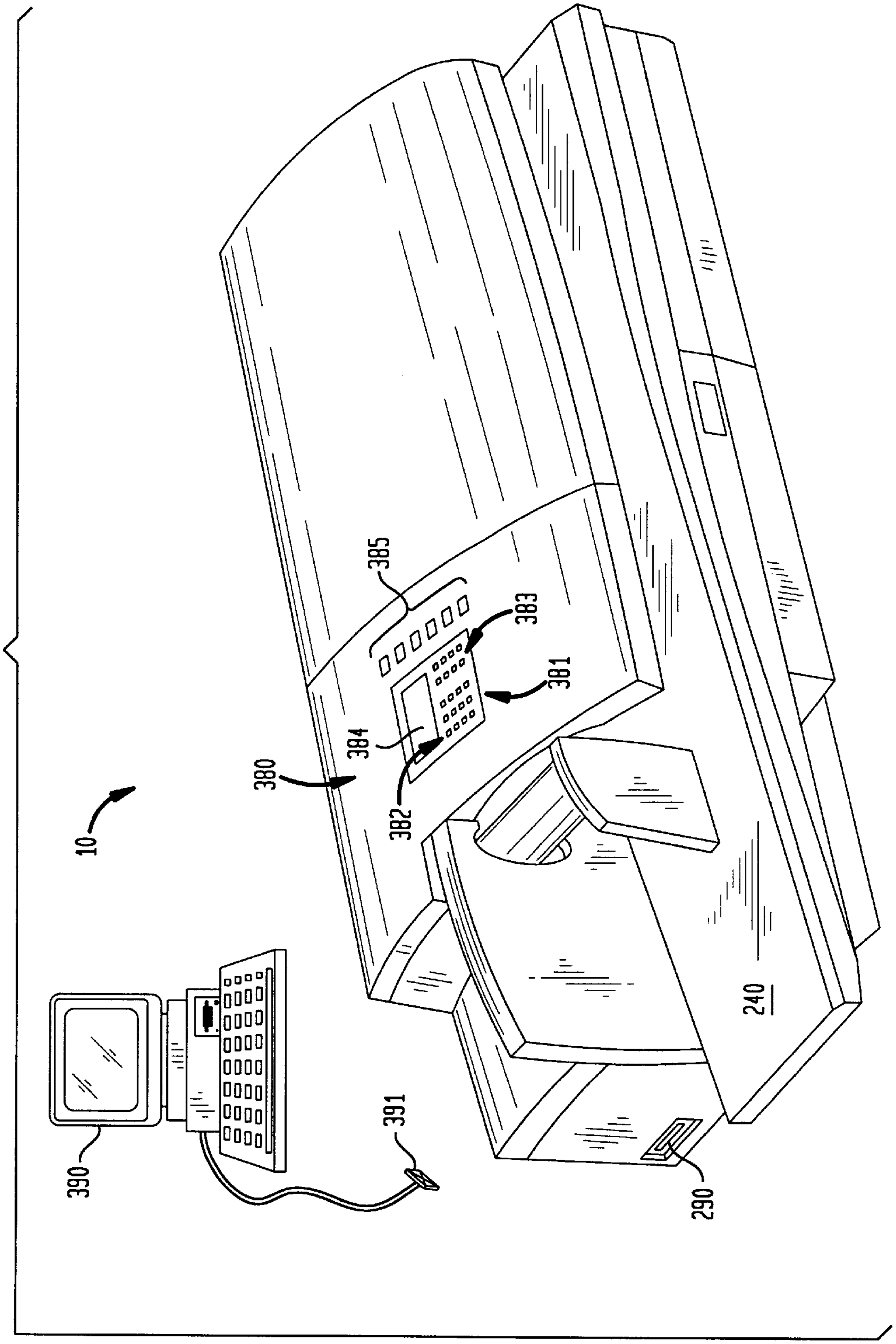
FIG. 1 is a perspective view of a mailing machine and an external user interface in accordance with the present invention.

Referring to FIG. 1, a mailing machine 10 including a user interface 380 having a resident display/keyboard 381 and a set of function keys 385, a feed deck 240 and an external connector or communication port 290 is shown. An external user interface 390 having a connector 391 may be connected to the mailing machine 10 at connector 290 for the purpose of adding additional memory, computing resources, an improved graphics display or other features as described above. The external user interface 390 may be a personal computer, a laptop computer or any other suitable computing device configured to address the needs of each particular operator. Further details will be provided in the remaining Figures and the written text below.

Figure 2:
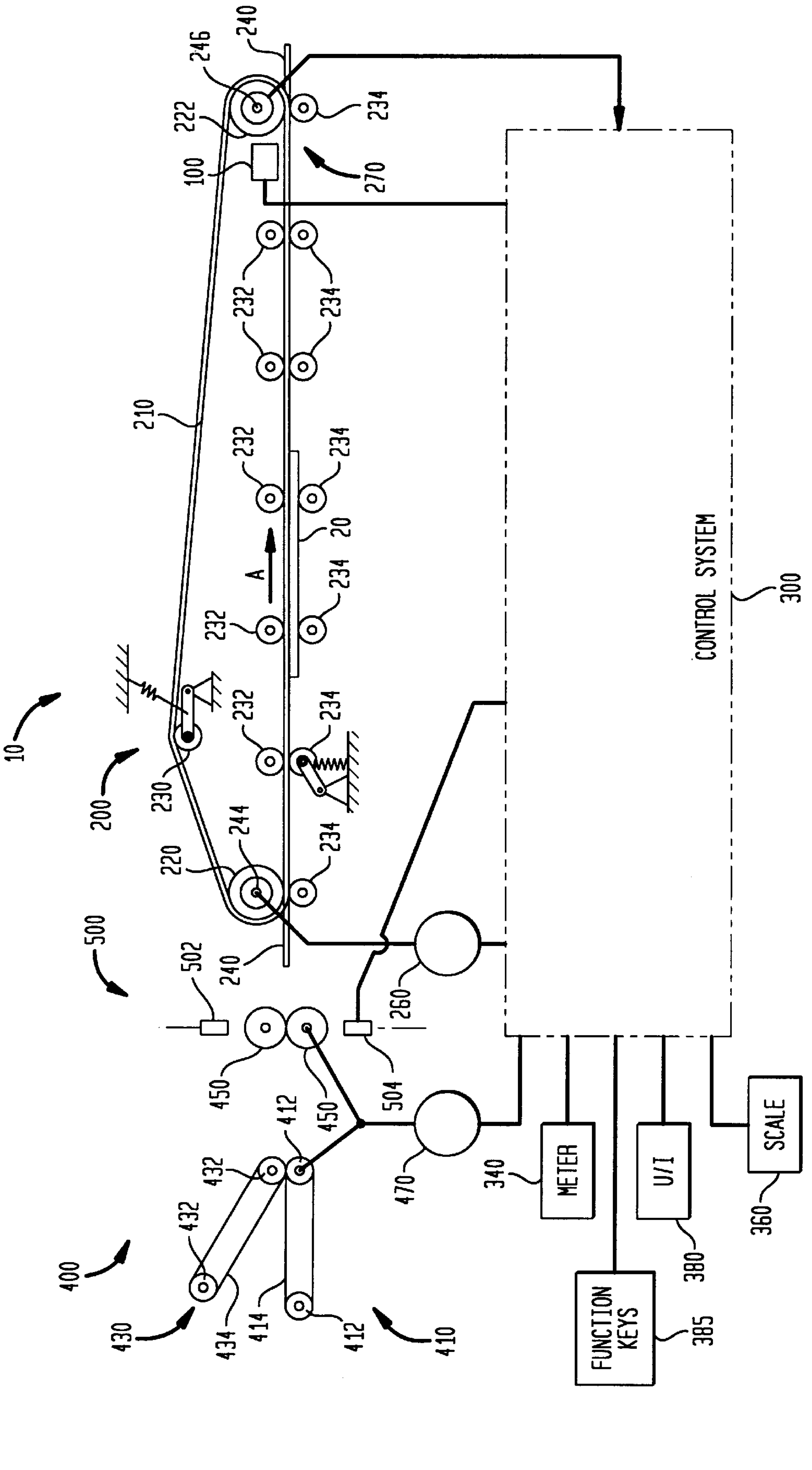
FIG. 2 is a schematic representation of an elevational view of the mailing machine in accordance with the present invention.

Referring to FIG. 2, a more detailed schematic representation of the mailing machine 10 is shown. The mailing machine 10 further includes a print head 100, a transport apparatus 200, a micro control system 300, a singulator module 400, a postage meter 340 and a scale 360. The postage meter 340 keeps account of the postal funds while the scale 360 supplies information about the weight of the envelope 20 which is used to determine the proper amount of postage to be applied to the envelope 20.

The singulator module 400 receives a stack of envelopes (not shown), or other mailpieces such as postcards, folders and the like, and separates and feeds them at variable speed in seriatim fashion (one at a time) in a path of travel as indicated by arrow A. Downstream from the path of travel, the conveyor apparatus 200 feeds envelopes at constant speed in the path of travel along a deck (not shown) past the print head module 100 so that an indicia of postage can be printed on each envelope 20. Together, the singulator module 400 and the conveyor module 200 make up a transport apparatus for feeding the envelopes 20 through the various modules of the mailing machine 10.

The transport apparatus 200 feeds envelopes in a seriatim fashion in the path of travel along the deck 240 as indicated by arrow A past the print head 100 so that an indicia of postage can be printed on each envelope 20. The print head 100 is an ink jet print head having a plurality of ink jet nozzles (not shown) for ejecting droplets of ink in response to appropriate signals. The print head 100 may be of any conventional type such as those commonly available from various ink jet print head manufacturers. So that the postal indicia is spaced a predetermined distance from the top edge of the envelope 20, the envelope 20 is aligned along its top edge with a registration wall (not shown) as it is fed through the mailing machine 10. The print head module 100 is accordingly spaced a predetermined distance transverse to the registration wall.

The singulator module 400 includes a feeder assembly 410 and a retard assembly 430 which work cooperatively to separate a batch of envelopes (not shown) and feed them one at a time to a pair of take-away rollers 450. The feeder assembly 410 includes a pair of pulleys 412 having an endless belt 414 extending therebetween. The feeder assembly 410 is operatively connected to a motor 470 by any suitable drive train which causes the endless belt 414 to rotate clockwise so as to feed the envelopes in the direction indicated by arrow A. The retard assembly 430 includes a pair of pulleys 432 having an endless belt 434 extending therebetween. The retard assembly 430 is operatively connected to any suitable drive means (not shown) which causes the endless belt 434 to rotate clockwise so as to prevent the upper envelopes in the batch of envelopes from reaching the take-away rollers 450. In this manner, only the bottom envelope in the stack of envelopes advances to the take-away rollers 450. Those skilled in the art will recognize that the retard assembly 430 may be operatively coupled to the same motor as the feeder assembly 410.

Since the details of the singulator module 400 are not necessary for an understanding of the present invention, no further description will be provided. However, an example of a singulator module suitable for use in conjunction with the present invention is described in U.S. Pat. NO. 4,7978, 114, entitled REVERSE BELT SINGULATING APPARATUS, the disclosure of which is specifically incorporated herein by reference.

The take-away rollers 450 are located adjacent to and downstream in the path of travel from the singulator module 400. The take-away rollers 450 are operatively connected to motor 470 by any suitable drive train (not shown). Generally, it is preferable to design the feeder assembly drive train and the take-away roller drive train so that the take-away rollers 450 operate at a higher speed than the feeder assembly 410. Additionally, it is also preferable that the take-away rollers 450 have a very positive nip so that they dominate control over the envelope 20. Consistent with this approach, the nip between the feeder assembly 410 and the retard assembly 430 is suitably designed to allow some degree of slippage.

The mailing machine 10 further includes a sensor module 500 which is substantially in alignment with the nip of take-away rollers 450 for detecting the presence of the envelope 20. Preferably, the sensor module 500 is of any conventional optical type which includes a light emitter 502 and a light detector 504. Generally, the light emitter 502 and the light detector 504 are located in opposed relationship on opposite sides of the path of travel so that the envelope 20 passes therebetween. By measuring the amount of light that the light detector receives, the presence or absence of the envelope 20 can be determined. In this manner, the length of the envelope 20 and the gaps between successive envelopes 20 can be measured.

The transport apparatus 200 includes an endless belt 210 looped around a drive pulley 220 and an encoder pulley 222 which is located downstream in the path of travel from the drive pulley 220 and proximate to the print head 100. The drive pulley 220 and the encoder pulley 222 are substantially identical and are fixably mounted to shafts 244 and 246, respectively, which are in turn rotatively mounted to any suitable structure (not shown) such as a frame. The shaft 244 is operatively connected to a motor 260 by any conventional means such as intermeshing gears (not shown) so that when the motor 260 rotates is response to signals from the micro control system 300, the drive pulley 220 also rotates which in turn causes the endless belt 210 to rotate and advance the envelope 20 along the path of travel.

The transport apparatus 200 further includes a plurality of idler pulleys 232, a plurality of normal force rollers 234 and a tensioner pulley 230. The tensioner pulley 230 is spring biased so as to keep constant and uniform tension on the endless belt 210. In this manner, the endless belt 210 will not slip on the drive pulley 220 when the motor 260 is energized and caused to rotate. The tensioner pulley 230 is spring biased outward so as to keep uniform tension on the belt 210. The idler pulleys 232 are rotatively mounted to any suitable structure (not shown) along the path of travel between the drive pulley 220 and the encoder pulley 222. The normal force rollers 234 are located in opposed relationship and biased toward the idler pulleys 232, the drive pulley 220 and the encoder pulley 222, respectively. Each normal force roller 234 is spring biased upward toward the idler pulleys 232 to keep a top surface (not shown) of the envelope 20 in contact with the belt 210. For the sake of simplicity, a suitable mounting arrangement is only shown with respect to one of the normal force rollers 234.

As described above, the normal force rollers 234 work to bias the envelope 20 up against the deck 240. This is commonly referred to as top surface registration which is beneficial for ink jet printing. Any variation in thickness of the envelope 20 is taken up by the deflection of the normal force rollers 234. Thus, a constant gap (the distance between the print head 100 and the deck 240) is set between the envelope 20 and the print head 100 no matter what the thickness of the envelope 20. The constant gap is optimally set to a desired value to achieve quality printing. It is important to note that the deck 240 contains suitable openings for the endless belt 210 and normal force rollers 234.

The transport apparatus 200 also includes an encoder system 270 which is located proximate to the print head 100 and operatively coupled to the encoder pulley 222. The encoder system 270 includes an encoder disk (not shown) fixably mount to the shaft 246 and an encoder detector (not shown) fixably mounted to a frame (not shown). Thus, as the encoder pulley 222 rotates so does the encoder disk. The encoder disk may be of any conventional type, such as model number HP 5100 available from Hewlett-Packard Company, that has a plurality of vanes located around its circumference. The encoder detector may also be of any conventional type, such as model number HP 9100 available from Hewlett-Packard Company, and includes a light source (not shown) and a light detector (not shown). The encoder disk and the encoder detector are positioned with respect to each other so that the vanes of the encoder disk alternately block and unblock the light source as the shaft 246 rotates. In this manner, the position and speed of the shaft 246 can be tracked. This type of encoder system 270 is well known and those skilled in the art will recognize other means for encoding which would serve equally well.

The transport apparatus 200, the print head 100, singulator module 400, sensor module 500 and the encoder system 270 as described above are under the control of the microcontrol system 300 which will be described in more detail below. The micro control system 300 provides energizing signals to the motor 260, the motor 470 and the print head 100 in response to signals received from the sensor module 500 and the encoder system 270. Additionally, the microcontrol system 300 is in operative communication with the user interface 380, the postage meter 340 and the scale 360.

Figure 3:
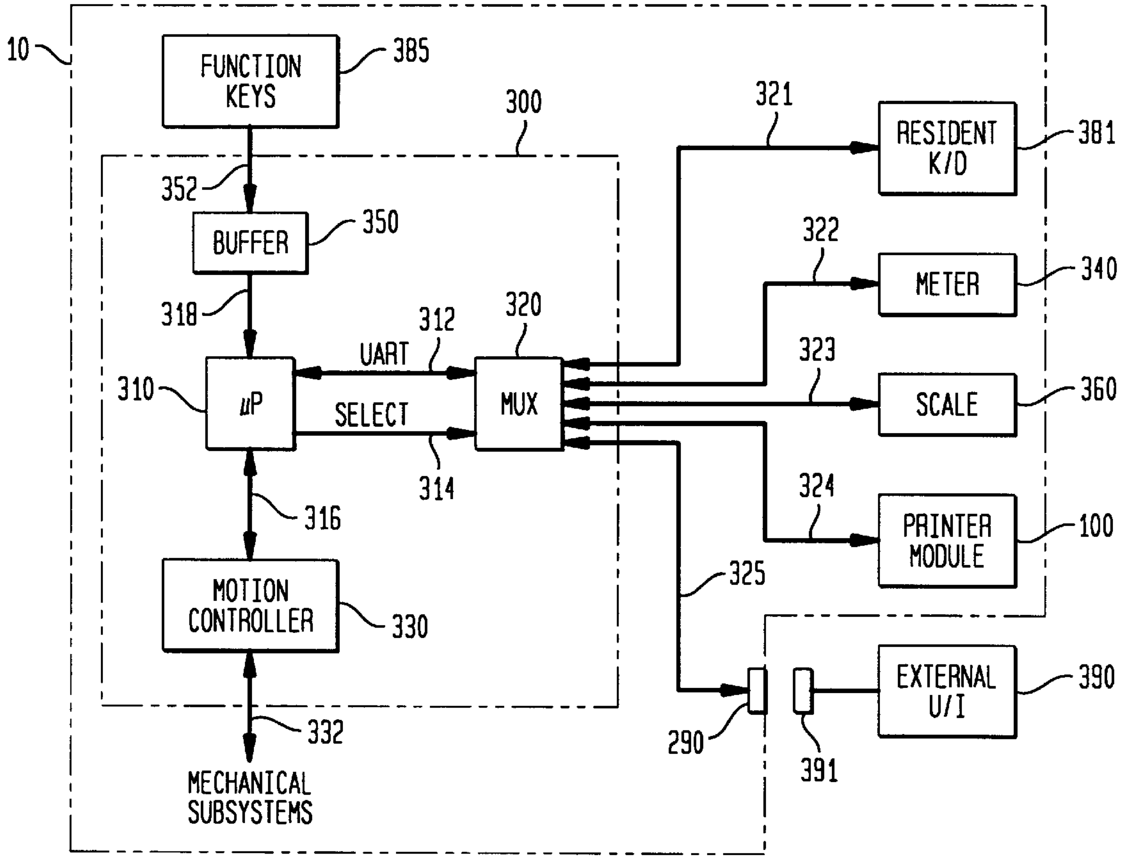
FIG. 3 is a more detailed schematic representation of a microcontrol system of the mailing machine in accordance with the present invention.

Referring to FIG. 3, the microcontrol system 300 of the mailing machine 10 is shown in more detail along with the interfaces to the other components of the mailing machine 10 described above. The microcontrol system 300 includes a microprocessor 310 in operative communication with a multiplexer 320 over a universal asynchronous receiver/transmitter (UART) channel 312 and a select line 314. The multiplexer 320 is in turn in operative communication with the resident display/keyboard 381, the postage meter 340, the scale 360 and the printer module 100 over a plurality of asynchronous serial data links 321–324, respectively. An additional asynchronous serial data link 325 is provided to the external connector 290. Generally, the multiplexer 320 operates as a switch to allow the microprocessor 310 to establish a connection with one device (resident display/keyboard 381, the postage meter 340, the scale 360, the printer module 100 or an external device) requiring intelligent communication at a time. This is achieved by the microprocessor 310 placing an appropriate signal on the select line 314 which instructs the multiplexer 320 to place a particular one of the data links 321–325 into communication with the microprocessor 310 over the UART 312. A more detailed description of the operation of this portion of the microcontrol system 300 is found in copending U.S. patent application Ser. No. 08/572,321; filed on Dec. 14, 1995, and entitled MULTIPLEX SERIAL DATA COMMUNICATIONS WITH A SINGLE UART FOR A POSTAGE METER MAILING MACHINE SYSTEM (E-471).

The microcontrol system 300 further includes a motion controller 330 and a buffer 350. The motion controller 330 is in operative communication with the microprocessor 310 over a suitable communication bus 316. In turn, the motion controller 330 is in operative communication with the mechanical subsystems of the mailing machine 10, including the motor 470, the motor 260, the sensor module 500 and the encoder system 270, over a suitable communication bus 332. The motion controller 330 receives appropriate feedback signals from the mechanical subsystems and supplies appropriate drive signals from the microprocessor 310 to the mechanical subsystems so that the feeding of the envelope 20 through the mailing machine 10 is coordinated with the operation of the various modules of the mailing machine 10. The buffer 350 is in operative communication with the microprocessor 310 over a communication bus 318 and is in operative communication with the function keys 385 over a communication line 352.

Referring to FIGS. 1 and 3, the user interface 380 allows for communication between the operator and the mailing machine 10 and includes the function keys 385 and the resident display/keyboard 381 having a numeric keypad 382, a set of keys 383 and a display 384 (CRT, LED, LCD or otherwise). The keys 383 provide access to a set of "soft" commands or functions, such as: enter, clear, download postage, generate report, account setup, diagnostics and the like. By soft commands, it is meant that these commands are not directly related to processing a batch of mailpieces. In contrast, the function keys 385 provide access to a set of "hard" commands, such as: start, stop, print tape, reset batch counter, weigh mode on/off, sealer/moistener mode on/off and the like, which are directly related to processing a batch of mailpieces.

Figure 4:
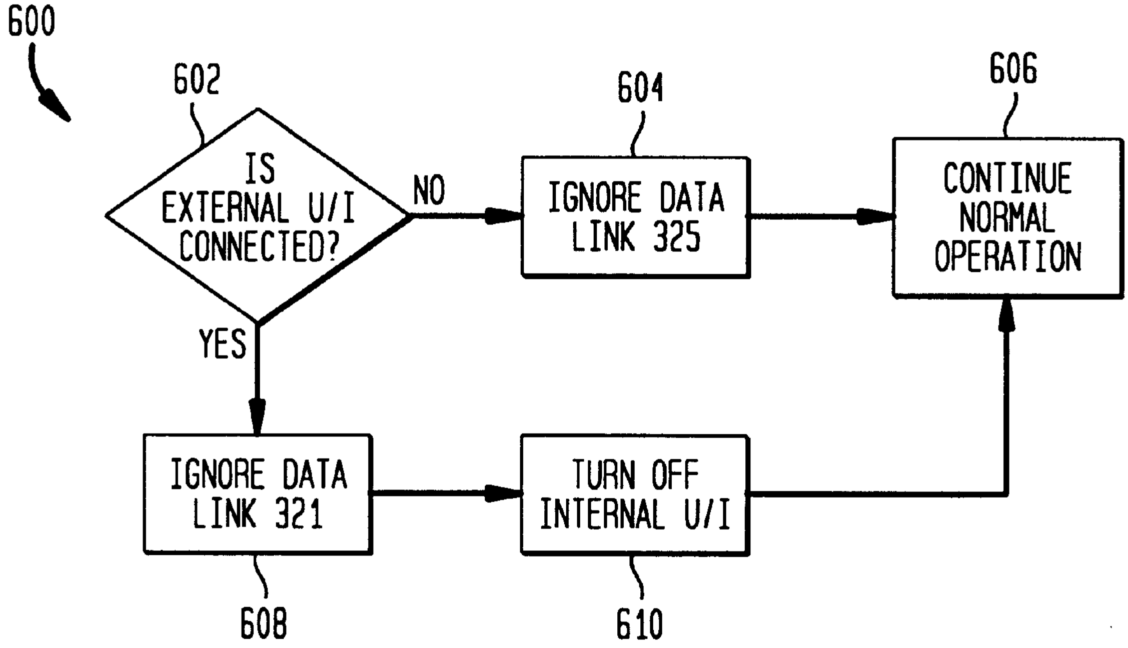
FIG. 4 is a flow chart of the operation of the mailing machine in accordance with the present invention.

With the structure of the mailing machine 10 described as above, the operational characteristics will now be described with reference to FIG. 4 in view of FIGS. 1–3. A routine 600 is run by the microprocessor 310 which controls the session initialization of the mailing machine 10 following power ups and reboots. At 602 a determination is made whether the external user interface 390 is attached to data link 325 via connector 290 and connector 391. This is accomplished by the microprocessor 310 sending an appropriate select signal to the multiplexer 320 to connect the microprocessor 310 with data link 325. Then, the microprocessor 310 queries data link 325 to see if a response is received from an attached external user interface 390. If at 602 the answer is no, then at 604 the microprocessor 310 ignores data link 325 for the remainder of the session. This is accomplished by the microprocessor 310 not outputting the appropriate select signal during polling operations to the multiplexer 320 so as to connect the microprocessor 310 with data link 325. Next, at 606 the microprocessor 310 continues normal operation which involves completing other initialization steps until the mailing machine 10 is ready to process envelopes 20.

On the other hand, if at 602 the answer is yes, then at 608 the microprocessor 310 ignores data link 321 for the remainder of the session. Here again, this is accomplished by the microprocessor 310 not outputting the appropriate select signal during polling operations to the multiplexer 320 so as to connect the microprocessor 310 with data link 321. Effectively, this results in a portion of the resident user interface 380 being disabled since no communication pathway is available between the microprocessor 310 and the resident user interface 380. Those skilled in the art will appreciate that there are other ways to disable the resident user interface 380, such as by: terminating power to the portions of the resident user interface 380 to be disabled or ignoring signals from the portions of the resident user interface 380 to be disabled. It is important to note, however, that the function keys 385 are still enabled or active because they communicate with the microprocessor 310 via line 352 which is unaffected by ignoring data link 321. Next, the routine 600 proceeds to 606 where the microprocessor 310 continues normal operation.

It should now be apparent to those skilled in the art that the mailing machine 10 of the present invention provides a base mailing machine 10 having a user interface 380 with the capability to recognize and establish communications with an external user interface 390 for the purpose of adding features to the base mailing machine 10, such as: accounting, report generation, rate information, additional rate table and carrier information. This is accomplished by establishing the capability within the base mailing machine 10 to interface with the external user interface 390 without having to make any hardware or software changes to the base mailing machine 10. That is, the hooks to add increased functionality are already present in the base mailing machine 10.

Also, by ignoring data link 321 if the external user interface 390 is connected, the polling requirements on the microprocessor 310 are reduced and response time does not suffer. Moreover, by allowing the function keys 385 to remain active, operator efficiency is maintained because those function necessary to process a batch of mailpieces are accessible from the base mailing machine 10 without the need to access the external user interface 390 which may be located remotely from the base mailing machine 10. Furthermore, since the function keys 385 have a direct connection to the microprocessor 310, the response time is better than if connected via one of the data links 321–325.

Many features of the preferred embodiment represent design choices selected to best exploit the inventive concept as implemented in a mailing machine with a long transport path. Moreover, additional advantages than those described above and various modifications will readily occur to those skilled in the art. For example, the exact set of commands that are available from the function keys 385 may be changed depending upon the features of the mailing machine 10 and the needs of the operator. As another example, the data links 321–325, communication buses 316, 318, and 332 and communication lines 312, 314 and 352 represent design choices best selected for the intended application. However, those skilled in the art will recognize that any suitable communication pathways could be substituted for those of the preferred embodiment. Therefore, the inventive concept in its broader aspects is not limited to the specific details of the preferred embodiment but is defined by the appended claims and their equivalents.

What is claimed is:

1. A mailing machine comprising:

an external communication port;

a resident user interface; and a control system in operative communication with the resident user interface and the external communication port, the resident user interface including a plurality of function keys and a keyboard/display, the control system for:

determining whether or not an external user interface is connected at the external communication port the external user interface including a keyboard/display and providing additional functionality beyond the resident user interface; and if the external user interface is connected, then enabling the external user interface and disabling the keyboard/display of the resident user interface.

2. The mailing machine of claim 1, wherein:

the plurality of function keys are in operative communication with the control means over a first pathway, the keyboard/display is in operative communication with the control system over a second pathway; and the control system disables the keyboard/display by disabling the second pathway.

3. The mailing machine of claim 2, wherein:

the plurality of function keys represent hard commands.

4. The mailing machine of claim 3, wherein:

the control system determines whether or not the external user interface is connected at the external communication port during every session initialization of the mailing machine.

5. A method of operating a mailing machine including a control system, a resident user interface including a plurality of function keys and a keyboard/display, the method comprising the step(s) of:

determining whether or not an external user interface is connected at an external communication port of the mailing machine, the external user interface including a keyboard/display and providing additional functionality beyond the resident user interface; and if the external user interface is connected, then enabling the external user interface and disabling the keyboard/display of the resident user interface.

6. The method of claim 5, further comprising the step(s) of:

establishing communication between the plurality of function keys and the control system over a first pathway;

establishing communication between the keyboard/display of the resident user interface and the control system over a second pathway; and disabling the keyboard/display of the resident user interface by disabling the second pathway.

7. The method of claim 6, wherein:

the plurality of function keys represent hard commands.

8. The mailing machine of claim 7, further comprising the step(s) of:

determining whether or not the external user interface is connected at the external communication port during every session initialization of the mailing machine.

9. The mailing machine of claim 4, wherein:

the control system includes a processor, a plurality of addressable data links, a dedicated communication link and a switching device in communication with the processor and the plurality of addressable data links for selectively placing the processor into communication with the plurality of addressable data links;

the keyboard/display of the resident user interface is operatively connected to a first of the plurality of addressable data links;

the external communication port is connected to a second of the plurality of addressable data links;

the function keys are in communication with the processor over the dedicated communication link;

the control system polls the second of the plurality of addressable data links to determine if the external user interface is connected; and if the external user interface is connected, then the processor enables the external user interface by continuing to poll the second of the plurality of addressable data links and disables the keyboard/display of the resident user interface by discontinuing to poll the first of the plurality of addressable data links.

10. The mailing machine of claim 9, wherein:

if the external user interface is not connected, then the processor continues to poll the first of the plurality of addressable data links and discontinues to poll the second of the plurality of addressable data links.

11. The mailing machine of claim 10, wherein:

once the processor determines not to poll either the first of the plurality of addressable data links or the second of the plurality of addressable data links depending upon whether or not the external user interface is connected, the polling of all of the plurality of addressable data links does not resume until a subsequent session initialization.

12. The mailing machine of claim 1, wherein:

the control system includes a processor, a plurality of addressable data links, a dedicated communication link and a switching device in communication with the processor and the plurality of addressable data links for selectively placing the processor into communication with the plurality of addressable data links;

the keyboard/display of the resident user interface is operatively connected to a first of the plurality of addressable data links;

the external communication port is connected to a second of the plurality of addressable data links;

the function keys are in communication with the processor over the dedicated communication link;

the control system polls the second of the plurality of addressable data links to determine if the external user interface is connected; and if the external user interface is connected, then the processor enables the external user interface by continuing to poll the second of the plurality of addressable data links and disables the keyboard/display of the resident user interface by discontinuing to poll the first of the plurality of addressable data links.

13. The mailing machine of claim 12, wherein:

if the external user interface is not connected, then the processor continues to poll the first of the plurality of addressable data links and discontinues to poll the second of the plurality of addressable data links.

14. The mailing machine of claim 13, wherein:

once the processor determines not to poll either the first of the plurality of addressable data links or the second of the plurality of addressable data links depending upon whether or not the external user interface is connected, the polling of all of the plurality of addressable data links does not resume until a subsequent session initialization.

15. The method of claim 8, wherein the mailing the control system includes a processor, a plurality of addressable data links, a dedicated communication link and a switching device in communication with the processor and the plurality of addressable data links, the method further comprising the step(s) of:

selectively placing the processor into communication with the plurality of addressable data links;

operatively connecting the keyboard/display of the resident user interface to a first of the plurality of addressable data links;

operatively connecting the external communication port to a second of the plurality of addressable data links;

placing the function keys in communication with the processor over the dedicated communication link;

polling the second of the plurality of addressable data links to determine if the external user interface is connected; and if the external user interface is connected, enabling the external user interface by continuing to poll the second of the plurality of addressable data links and disabling the keyboard/display of the resident user interface by discontinuing to poll the first of the plurality of addressable data links.

16. The method claim 15, comprising the step(s) of:

if the external user interface is not connected, continuing to poll the first of the plurality of addressable data links and discontinuing to poll the second of the plurality of addressable data links.

17. The method of claim 16, comprising the step(s) of:

once the processor determines not to poll either the first of the plurality of addressable data links or the second of the plurality of addressable data links depending upon whether or not the external user interface is connected, ceasing to poll all of the plurality of addressable data links until a subsequent session initialization.

18. The method of claim 5, wherein the mailing the control system includes a processor, a plurality of addressable data links, a dedicated communication link and a switching device in communication with the processor and the plurality of addressable data links, the method further comprising the step(s) of:

selectively placing the processor into communication with the plurality of addressable data links;

operatively connecting the keyboard/display of the resident user interface to a first of the plurality of addressable data links;

operatively connecting the external communication port to a second of the plurality of addressable data links;

placing the function keys in communication with the processor over the dedicated communication link;

polling the second of the plurality of addressable data links to determine if the external user interface is connected; and if the external user interface is connected, enabling the external user interface by continuing to poll the second of the plurality of addressable data links and disabling the keyboard/display of the resident user interface by discontinuing to poll the first of the plurality of addressable data links.

19. The method claim 18, comprising the step(s) of:

if the external user interface is not connected, continuing to poll the first of the plurality of addressable data links and discontinuing to poll the second of the plurality of addressable data links.

20. The method of claim 19, comprising the step(s) of:

once the processor determines not to poll either the first of the plurality of addressable data links or the second of the plurality of addressable data links depending upon whether or not the external user interface is connected, ceasing to poll all of the plurality of addressable data links until a subsequent session initialization.

* * * * *